(12) United States Patent
Joshi (10) Patent No.: US 12,375,489 B2
(45) Date of Patent: Jul. 29, 2025

(54) SYSTEM AND METHOD FOR MULTI-FACTOR AUTHENTICATION

(71) Applicant: Capital One Services, LLC, McLean, VA (US)

(72) Inventor: Rohit Joshi, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 212 days.

(21) Appl. No.: 18/076,694

(22) Filed: Dec. 7, 2022

(65) Prior Publication Data

US 2024/0195808 A1 Jun. 13, 2024

(51) Int. Cl.
*G06F 21/00* (2013.01)
*H04L 9/40* (2022.01)

(52) U.S. Cl.
CPC .......... *H04L 63/0884* (2013.01); *H04L 63/18* (2013.01); *H04L 2463/082* (2013.01)

(58) Field of Classification Search
CPC .................. H04L 63/0884; H04L 63/18; H04L 2463/082; H04L 63/083
See application file for complete search history.

(56) References Cited

U.S. PATENT DOCUMENTS

| | | | |
|---|---|---|---|
| 7,610,618 B2 * | 10/2009 | Patrick | H04L 63/08 726/7 |
| 9,686,255 B2 | 6/2017 | Rafiq | |
| 10,110,584 B1 | 10/2018 | Schmoyer et al. | |
| 10,666,657 B1 * | 5/2020 | Threlkeld | H04L 9/0643 |
| 10,715,514 B1 * | 7/2020 | Threlkeld | H04L 63/0807 |
| 11,184,766 B1 | 11/2021 | Lord et al. | |
| 2013/0347129 A1 * | 12/2013 | Samuelsson | H04L 9/3231 726/28 |
| 2014/0026203 A1 * | 1/2014 | Ho | H04L 63/168 726/9 |
| 2016/0359849 A1 * | 12/2016 | Nakajima | H04L 63/0853 |
| 2017/0171200 A1 * | 6/2017 | Bao | H04L 9/3213 |
| 2018/0167384 A1 * | 6/2018 | Raepple | G06F 21/335 |
| 2018/0351950 A1 * | 12/2018 | Bao | H04L 63/0884 |
| 2020/0250664 A1 | 8/2020 | Kumar et al. | |

(Continued)

OTHER PUBLICATIONS

International Search Report for International Application No. PCT/US23/82750, mailed on Apr. 3, 2024, 7 pages.

*Primary Examiner* — Kendall Dolly
(74) *Attorney, Agent, or Firm* — Sterne, Kessler, Goldstein & Fox P.L.L.C.

(57) ABSTRACT

A system and method for authentication a user attempting access to a service is disclosed herein. When a user attempts to gain access, a client associated with the user generates a unique authentication code that is stored at a callback server associated with the client. The user accesses an authentication server associated with the service and provides the authentication server with standard login credentials. The authentication server also obtains the authentication code from the user. If the authentication server successfully verifies the user's credentials, then the authentication server transmits a code validation request to the callback server to validate the authentication code. The callback server verifies that the received code matches a stored code and is current, and then issues a reply message to the authentication server. The authentication server grants or denies the user's access request based on the reply.

18 Claims, 6 Drawing Sheets

(56) References Cited

U.S. PATENT DOCUMENTS

| | | | |
|---|---|---|---|
| 2021/0287211 A1* | 9/2021 | Aabye | H04L 63/08 |
| 2022/0217135 A1 | 7/2022 | Jarvis et al. | |
| 2023/0308546 A1* | 9/2023 | DiMaria | H04M 3/5231 |

* cited by examiner

SYSTEM AND METHOD FOR MULTI-FACTOR AUTHENTICATION

TECHNICAL FIELD

Embodiments of the present disclosure relate to authentication and system access, such as verifying user authorization to access a remote system and/or server.

BACKGROUND

Many computer systems operate remotely from their respective users, and yet hold and maintain sensitive data and/or carry out proprietary functions. Thus, it is common to require that a user authenticate themselves in order to verify that they are permitted to access the content on the service provider system. However, current authentication mechanisms are limited to verifying that a user is in possession of certain credentials. Thus, if the user has the credentials, they are granted access even if they are not actually authorized. Thus, there is a need for an authentication system and method that verifies a login attempt as being authorized, in addition to the user credentials.

BRIEF DESCRIPTION OF THE DRAWINGS/FIGURES

The accompanying drawings are incorporated herein and form a part of the specification.

In the drawings, reference numbers generally indicate identical or similar elements. Additionally, generally, the left-most digit(s) of a reference number identifies the drawing in which the reference number first appears.

DETAILED DESCRIPTION

Provided herein are a method, a system, computer program product embodiments, and/or combinations and subcombinations thereof for authentication a user and providing access to a secure system.

Disclosed embodiments relate to authenticating a user based on communicating with a client callback server. In other words, a secure system may employ an authentication server at its front-end in order to intercept users seeking to access the system. When a user seeks access to the secure system, a client associated with the user generates a unique code, which it stores at a client-side callback server. Once the user establishes possession of the credentials, the authentication server communicates with the client-side callback server to verify that the code received from the user is valid. The callback server verifies the validity of the code and replies to the authentication server. Depending on whether the verification succeeded or failed, the authentication server grants or denies the user access to the secure system. This authentication ensures that a user that is in possession of authentication credentials is also authorized by the client with which the credentials are associated. In other words, this authentication prevents access by bad actors, for which no such authentication code has been generated.

Many computer systems operate remotely from their respective users, and yet hold and maintain sensitive data and/or carry out proprietary functions. Thus, it is common to require that a user authenticate themselves in order to verify that they are permitted to access the content on the service provider system. However, current authentication mechanisms are limited to verifying that a user is in possession of certain credentials. Thus, if the user has the credentials, they are granted access even if they are not actually authorized. Given the current climate of data hacks and other login exposures, this can result in bad actors gaining unauthorized access to sensitive data and systems.

Specifically, hackers often break into user databases and obtain login and password data for users of a system. Similarly, even without a direct break in, user credentials are eventually exposed during an access attempt, whether during the entry into an online form, through an HTTP header, or otherwise. An outside observer can thus obtain the user's credentials through monitoring of the user's activities. A bad actor can then obtain access to the secure system using the user's credentials.

Even modern two-factor authentication can be subverted in a variety of different ways. For example, most two-factor authentication methods employ a text message or email notification to the supposed "owner" to alert them to the login attempt and request them to verify the attempt. However, a hacker with access to the user data can update the user data to replace the correct contact information with contact information accessible by the hacker (e.g., a false email address or phone number). Thus, when the bad actor enters the user's credentials, the second factor will be sent to the bad actor and quickly approved. Other mechanisms exist to bad actors for spoofing or otherwise falsifying the two-factor authentication. Thus, there is a need for an authentication system and method that authenticates a user both on the provided credentials, but also based on another factor that cannot be easily subverted by a bad actor.

Embodiments of the present disclosure employ a callback server associated with a client system. A client may be an entity that is associated with the user and that has some oversight interest in the user's access to the service, and the client system may include one or more computer systems and/or servers, including the callback server. During a registration process, the client system associated with the client notifies the authentication server of an address and/or contact method for the callback server. When a user associated with the client seeks to make a login attempt at the authentication server, the client system generates a unique authentication code, which it stores at the callback server. The user then proceeds to attempt to login to the secure system as normal by providing the system with the user's credentials. The authentication server first checks for a match of the user authentication information to stored authentication information. Provided that there is a match, the authentication server proceeds to the second phase of the authentication procedure.

In the next phase of the authentication, the authentication server verifies the login attempt. In other words, the client only generates the authentication code when there is an upcoming login attempt by a known user. Therefore, a login will only be valid if there is a valid authentication code. When the login occurs, the authentication server obtains the authentication code through any of a variety of different methods described herein. Once the user's credentials are verified, the authentication server sends the authentication code to the known server of the client. The client verifies that the authentication code is valid, and replies to the authentication server with either a SUCCESS or FAILURE message. The authentication server then grants or denies the user access based on this reply. Because there is no user involvement in the second authentication factor, and because the authentication code must be generated by, and verified by, a registered client server, the ability of bad actors to gain access to the secure systems protected by the authentication server is severely diminished.

Various embodiments of these features will now be discussed with respect to the corresponding figures.

Figure 1:
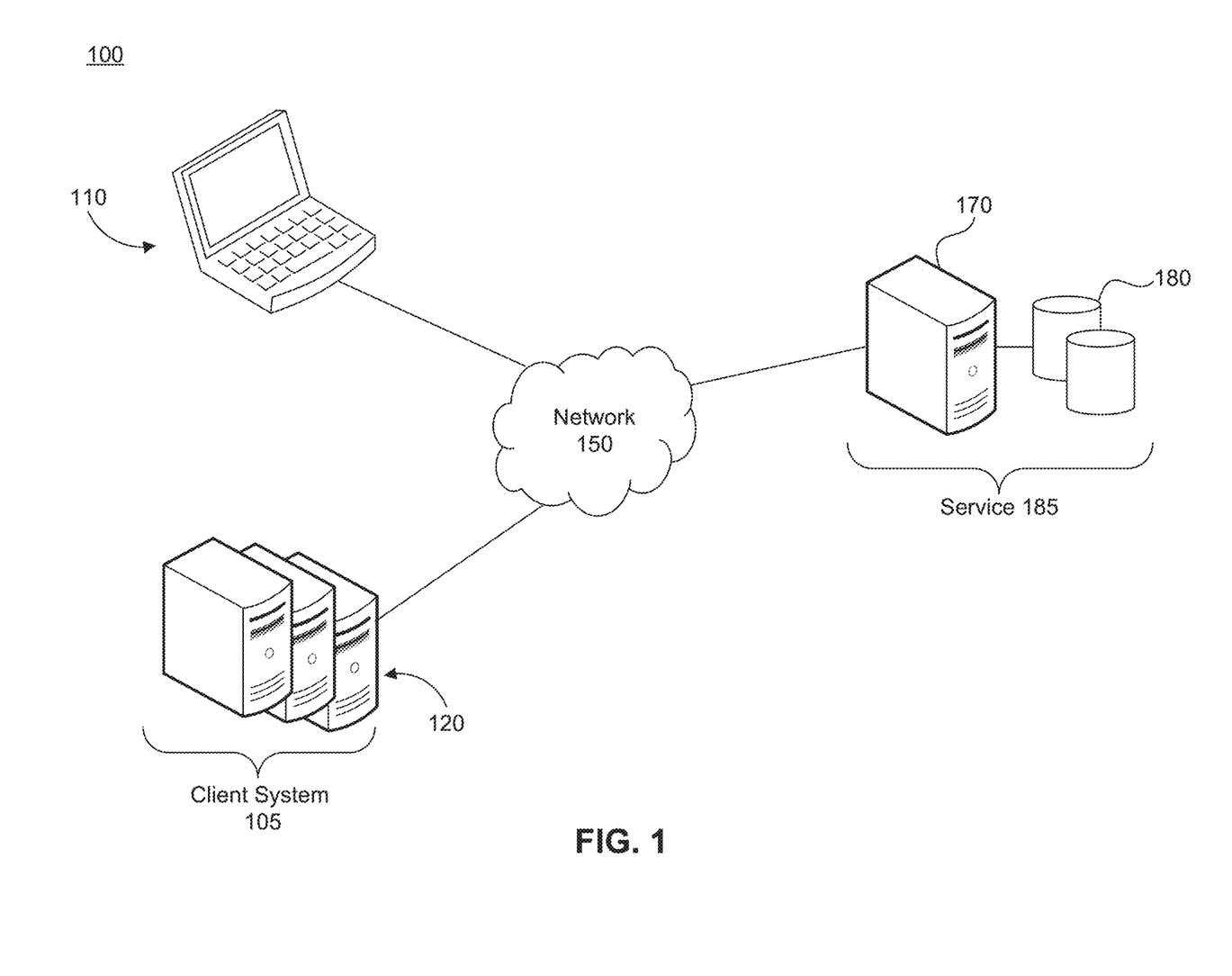
FIG. 1 illustrates an exemplary authentication environment according to embodiments.

FIG. 1 illustrates an exemplary authentication environment 100 according to embodiments. As shown in FIG. 1, a user terminal 110 and a callback server 120 exist on a side of a client system 105, and an authentication server and one or more databases 180 exist on a side of the service 185. The user terminal 110 may be any suitable device capable of accessing the service 185, such as but not limited to a personal computer, smartphone, PDA, gaming system, etc. In embodiments, the user is associated with the client. For example, in some embodiments, the user is an employee or other worker registered to access the service 185 on behalf of the client. In other embodiments, the user may be a resident of a facility that grants their residents access to the service 185, or a member of some other authorized group.

In an embodiment, the callback server 120 is owned, operated, and/or maintained by the client. In other embodiments, the callback server 105 is merely associated with the client and may be a general use server owned and operated by a third party. In either scenario, prior to any login attempts, the client registers with the service 185. At this time, one or more users may be registered with the service 185. In other words, the client identifies certain users to the service 185 that have authorization to access the service 185 on behalf of the client 105. At this time, the client may also provide the service with login credentials for the registered users. Alternatively, users can separately login after the client has been registered in order to provide the service 185 with their credentials.

As part of the registration process, the client system 105 provides the service 185 with a contact address and/or contact method for verifying login attempts by users associated with the client. In embodiments, the contact address is an IP address, a URL, an email address, or other address. In embodiments, the contact method may include but is not limited to SIP signaling, Ethernet protocol, email, SMS messaging, or direct messaging, among others. Together, the contact address and contact method provide the service 185 with a means for verifying a login attempt with the client.

As shown in FIG. 1, the service 185 is accessed by the user device 110. In embodiments, the user uses one or more input devices (such as a mouse, keyboard, etc.) to navigate to the service 185. In embodiments, the service 185 can be accessed at a particular URL over an http interface via network 150. In embodiments, the network 150 can be any network suitable for providing electronic communication between the user device 110, the callback server 120, such as a WAN, LAN, WLAN, VPN, etc. When the user navigates to the service 185, the callback server 120 is notified of the attempt and generates an authentication code. The callback server can be notified of the login attempt in a variety of different ways. For example, in an embodiment, the user device 110 accesses the service 185 through a VPN associated with the client. When the URL of the service is detected, the client system 105 (e.g., the callback server 120) automatically generates the authentication code and stores it in the callback server 120. In another embodiment, the user first requests a login authorization from the client 105, which will grant the login, generate the code, and store the authorization code in the callback server 120.

Although the user has been described herein as a human user and the user device being a device usable thereby, in other embodiments, the user and the user device can instead be replaced by a system or application taking action on behalf of the user due to other triggers, such as but not limited to system events, alerts/monitoring, scheduled/batch jobs, remote applications, etc. In other words, the user/user device could be another client or application in the business-to-business communication over the Internet.

Regardless of how the client system 105 is notified, when the user accesses the service 185, the client 105 generates an authorization code and a corresponding expiration time. In an embodiment, the expiration time is predetermined as expiring a preset time from when the code was generated or from when the login attempt was detected (e.g., 1 minute from issuance, etc.). Once the authentication code has been generated, the client 105 stores the authentication code in the callback server 120 together with the expiration time. Likewise, the client 105 provides the authentication code to the user device 110. In an embodiment, this all occurs without user interaction or knowledge. Namely, when the user accesses the service 185, the client 105 automatically detects the action, generates the code, and provides the code to the user device 110 without any involvement by the user.

The user accesses the authentication server 170 of the service 185 over the network, at which point the user is requested to provide login credentials for accessing the service 185. The user uses the input devices of the user device to enter the login credentials, which may include but are not limited to, login ID, password, token, answer to secret question, username, biometrics, etc. Once this information is entered by the user into a corresponding form field, the user submits the information to the authentication server 170. At this time, the authentication code provided by the service to the user device 110 is also submitted. In an embodiment, this is carried out manually by the user. Namely, the code is provided to the user, and the user enters the code into the form field for submission. However, in another embodiment, the authentication code is provided to the service 185 automatically by the user device and without user interaction or knowledge. In this embodiment, the code (which may or may not be known to the user) can be injected into an HTTP header by the user device at the time of form submission. In this manner, the code remains secret and these extra authentication steps are performed seamlessly and unbeknownst to the user.

The authentication server 170 receives the user's credentials as well as authentication code. At the outset, the authentication server 170 verifies the user's credentials. Specifically, as discussed above, the authentication server 170 stores user credentials for all users registered to access the service 185. In an embodiment, the registered credentials are stored locally at the authentication server 170 in an onboard memory. In other embodiments, the registered credentials are stored remotely in a separate database or server. Thus, in an embodiment, the verification of the user's credentials includes the authentication server 170 identifying the user based on one or more of the provided credentials (e.g., username, user ID, etc.) and retrieving the user's credentials from storage based on this identification. Once retrieved, the authentication server 170 compares the credentials provided by the user to the credentials retrieved from storage to determine that they match.

If the credentials do not match, then the authentication server 170 denies access to the user and does not proceed to the second phase of the authentication process. Alternatively, if the authentication server 170 determines that the credentials match, then the authentication server 170 proceeds to the next phase of the authentication.

In the second phase of the authentication procedure, the authentication server 170 transmits a code verification request to the callback server 120 of the client 105. Specifically, as discussed above, the authentication server 170 stores user data in association with clients to which they are associated. The authentication server 170 also stores the callback address and contact method associated with the callback server 105. Therefore, when a login attempt by a user passes the first authentication process, the authentication server 170 identifies a client 105 associated with the user based on the user's credentials. The authentication server 170 then retrieves the callback server contact information from storage and receives the authentication code from the login. As discussed above, in different embodiments, the authentication code may be manually provided by the user, or can be automatically obtained by the authentication server 170 without user involvement and/or knowledge. In an example, the authentication server 170 obtains the authentication code from an HTTP header associated with the login request.

Once the authentication server 170 obtains the callback server contact information and the authentication code, the authentication server 170 transmits a message as defined by the callback server contact server to the callback server 120 of the client. In an embodiment, the message is a REQUEST-type message that includes the authentication code. As discussed above, in an embodiment, the message is a SIP message, an SMS message, or a proprietary message.

The callback server 120 receives the code validation request message from the authentication server 170, and checks the received authentication code against current codes. In other words, whenever any user associated with the client 105 attempts a login, a code is generated, which is maintained at the callback server 120 until the code expires, at which time the code is deleted or otherwise marked as invalid and/or expired. Thus, when the callback server 120 receives the request message from the authentication server 170, the callback server 120 compares the received authentication code against stored authentication codes and verifies that the received authentication code matches one of the stored authentication codes, and that the code is not expired. If either of these checks fails, then the callback server 120 transmits a FAILURE reply message to the authentication server 170 via the network 150 indicating that the validation of the authentication code failed. Alternatively, if both checks are met, then the callback server 120 transmits a SUCCESS reply message to the authentication server 170 via the network 150 indicating that the code is valid.

In response to the authentication server 170 receiving a FAILURE reply message from the callback server 120, the authentication server 170 denies access to the user. Alternatively, if the reply message is a SUCCESS message, then the authentication server 170 grants the user access to the service 185. In the manner described above, a user can be accurately authenticated even when a user's credentials have been stolen or otherwise misappropriated, since the bad actor attempting to access the server 185 will not have access to a valid authentication code. In different embodiments, this may be because no such code was ever generated because the login attempt was not detected by the client 105, because the bad actor was not able to properly submit the authentication code to the authentication server 170, or because the valid code expired before it could be used by the bad actor. Thus, unlike traditional two-factor authentication, access cannot be gained by being in possession of the user's device, or by intercepting or redirecting messages sent from the authentication server. Rather, because the authentication code is generated and stored by the client system, is only valid for a limited period of time, and requires contact from the authentication server in the manner agreed upon during registration, authentication can be accurately performed regardless of bad actor intervention.

Figure 2:
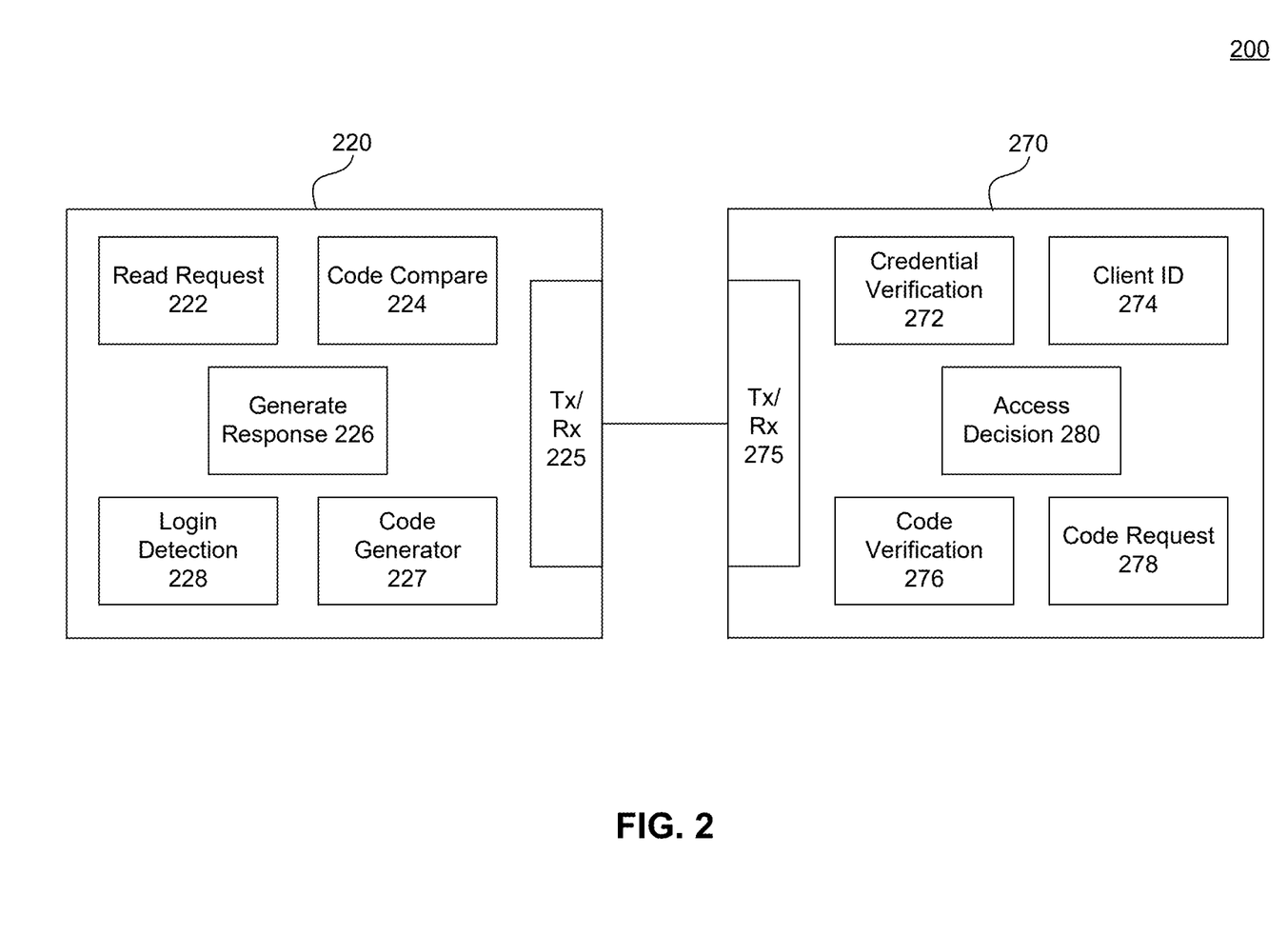
FIG. 2 illustrates a block diagram of an exemplary authentication system according to various embodiments.

FIG. 2 illustrates a block diagram of an exemplary authentication system 200 according to various embodiments. As shown in FIG. 2, the authentication system includes a callback server 220 and an authentication server 270. The callback server includes a transceiver 225 and several functional blocks, including a read request block 222, a code compare block 224, a generate response block 226, a login detection block 228, and a code generator block 227, and may represent an exemplary embodiment of callback server 120. Likewise, the authentication server includes a transceiver 275 and several functional blocks, including a credential verification block 272, a client identifier block 274, a code verification block 276, a code request block 278, and an access decision block 280, and may represent an exemplary embodiment of authentication server 270. In embodiments, the callback server 220 and the authentication server 270 each include a memory or other computer-readable storage medium and one or more processors (not shown), and the functional blocks of each of the callback server 220 and the authentication server 270 are carried out by programming code stored in the memory and executed by the one or more processors.

As shown in FIG. 2, the authentication server 220 includes a login detection block 228 that identifies that the user is attempting to login to the service 185. In an embodiment, the login detection block 228 is explicitly notified of the login attempt by the user, which transmits a message to the code generator block 227. However, in another embodiment, the login detection block 228 automatically detects the login attempt based on user activity, such as by detecting that the user has visited a URL corresponding to the server 185. In an embodiment, the initial URL detection is performed at the user device, and then the user device automatically notifies the client via the login detection block 220. In embodiments, the login detection is performed by monitoring user activity or Internet traffic at the user device.

Once the login has been detected, a code generator block 227 generates an authentication code for the user's login attempt. In an embodiment, the authentication code is a numerical binary value, such as a 16-bit, 32-bit, or higher number. Once the code has been generated, the callback server 220 transmits the authentication code to the user device 110 via the transceiver 225. The callback server 220 also stores the authentication code in memory together with an expiration time. In an embodiment, the expiration time is a predetermined amount of time from code creation, such as 30 seconds, 1 minute, two minutes, etc..

Meanwhile, the authentication server 270 receives a login request from the user that includes the user's login credentials. As discussed above, the login credentials may include login ID, user ID, username, email address, password, biometrics, answer to secret question, token, etc. In an embodiment, the user may also manually submit the authentication code. However, in another embodiment, the authentication server 270 automatically obtains the authentication code without user action, such as by extracting the authentication code from an HTTP header associated with the login request.

Once the user's credentials have been obtained, the credential verification block 272 retrieves stored credentials associated with the user and determines whether the credentials match. If the credential verification block 272 determines that the credentials provided by the user do not match the stored credentials, then the access decision block 280 rejects the login attempt and denies access to the user. On the other hand, if the credential verification block 272 determines that the credentials provided by the user match the stored credentials associated with the user, then the authentication server 270 progresses to the second authentication stage.

Specifically, in the second authentication stage, the client identification block 274 identifies the client with which the user is associated. In an embodiment, this determination is based on the user authentication credentials. Once the client has been identified, the authentication server 270 also obtains contact information of a callback server associated with the client. In an embodiment, the contact information includes a communication address of the callback server 220 and a communication method by which to communicate with the callback server 220.

Once the callback communication information has been obtained, the code request block 278 generates a code validation request. The code validation request is prepared by the code request block 278 according to the specification of the callback communication information. Specifically, in embodiments the callback communication information may specify a format or a destination address of the request. Thus, the code request block 278 generates the request message according to these specifications, and causes the transceiver 275 to transmit the request to the callback server 220. In an embodiment, the code validation request message includes the authentication code obtained during the login procedure.

The callback server 220 receives the code validation request message from the authentication server 270 via transceiver 225. The read request block 222 extracts the relevant information from the request message, including the authentication code and reply information. The code compare block 224 scans a database of stored authentication codes. In one embodiment, only current (e.g., valid) codes are stored. In another embodiment, all codes are stored along with a status identifier that identifies each code as being valid or invalid. The code compare block 224 determines from the scan whether the code included in the request message matches any valid code.

Following the code comparison, the generate response block 226 generates a reply message to be sent to the authentication server 270. If the received code matches a valid code at the callback server 220, then the generate response block 226 generates the reply message as a SUCCESS message. In an embodiment, the SUCCESS message informs the authentication server 270 that the validation of the authentication code was successful and that the user should be permitted access to the service 185. Alternatively, if the received code does not match any valid code at the callback server 220, then the generate response block 226 generates the reply message as a FAILURE message. In an embodiment, the FAILURE message informs the authentication server 270 that the code validation failed and that the user should be denied access. In embodiments, any reply message includes the authentication code or some other indicator as to the login request for which the message applied. The callback server 220 transmits the reply message via the transceiver 225.

The authentication server 270 receives the reply message via the transceiver 275. The code verification block 276 receives the reply message and determines whether the reply message indicates that the code has been verified or not. Specifically, a FAILURE reply message indicates to the authentication server 270 that the code has not been verified, and that the user should not be granted access. Meanwhile, a SUCCESS reply message indicates to the authentication server 270 that the code has been verified and that the user should be granted access to the service 185.

Based on the code verification block 276, the access decision block 280 determines whether to grant access to the user. In an embodiment, the user is only granted access to the service 185 if all the provided credentials match stored credentials and the code has been verified by the callback server. Based on this determination, the access decision block 280 grants or denies the user access to the service.

Figure 3:
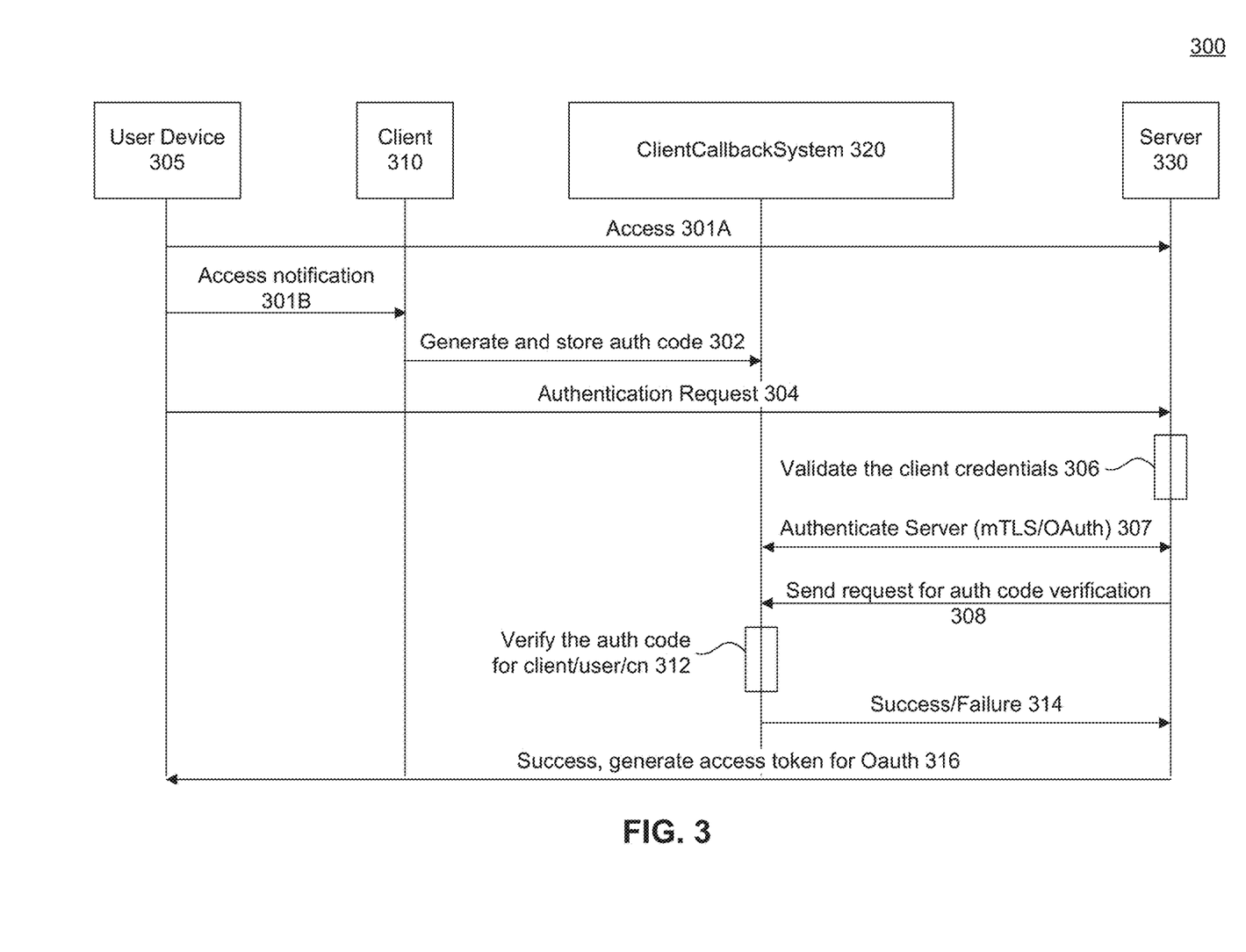
FIG. 3 illustrates a process flow diagram of an exemplary authentication process according to various embodiments.

FIG. 3. illustrates a process flow diagram of an exemplary authentication process 300 according to various embodiments. As shown in FIG. 3, the process 300 involves an exchange of messages between a user device 305, client system 310, a client callback system 320, and a server 330. In an embodiment, the user device 305 represents an exemplary embodiment of user device 110, client system 310 represents an exemplary embodiment of client system 105, clientCallbackSystem 320 represents an exemplary embodiment of callback server 120, and server 330 represents an exemplary embodiment of authentication server 170.

As shown in FIG. 3, the process begins at step 301A by the user device navigating to the service protected by the authentication server 330. The user device 305 then notifies the client 310 of an attempt by the user to access the service in step 301B. Depending on the specific implementation, steps 301A and 301B can occur in reverse order. For example, the user may make an explicit request to the client system 310 for a code, in which case step 301B may occur prior to navigation 301A. In embodiments, the client system 310 automatically detects the user login attempt or detects the user navigating to a URL associated with the server 185. In other embodiments, the user manually notifies the client of the upcoming login attempt.

In step 302, the client system 310 generates an authentication code and stores the authentication code at the ClientCallbackSystem 320.

After the code has been generated, the user device 305 submits an authentication request in step 304. In embodiments, the authentication request is submitted by a user associated with the client. In an embodiment, the authentication request entails the user provided login credentials and the authentication code to the server 330. As discussed above, the login credentials may include or more of login ID, user ID, username, email address, password, biometrics, answer to secret question, token, etc. Further, although the code may be known to the user and manually provided to the server 330 by the user, in other embodiments, the authentication code is unknown to the user and provided to the server 330 automatically, such as by being included in an HTTP header.

Upon receipt of the credentials, the server 330 conducts a validation process 306 in order to validate the client credentials 306. In an embodiment, the validation process 306 includes comparing the provided credentials against stored credentials in order to determine whether they match. If the credentials do not match, then the process effectively terminates, with the server 330 denying the user access to the service 185.

However, FIG. 3 assumes a successful authentication. Therefore, in one embodiment as shown in FIG. 3, if the credentials are successfully validated (e.g., the validation process 306 determines that the provided credentials match stored credentials), then the server 330 is authenticated in step 307. In this step, the server 330 provides certain credentials to the ClientCallbackSystem 320 so as to verify its identity. Such credentials may include a key, a certificate, an identifier, etc. In an embodiment, the server authentication 307 is an Mutual Transport Layer Security (mTLS) certification. mTLS is a type of mutual authentication in which both the ClientCallbackSystem 320 and the server 330 authenticate each other using a TLS protocol. In an embodiment, the mTLS authentication occurs during an initial connection of an SSL/TLS handshake. In another embodiment, server authentication 307 may be performed using Open Authentication (oAuth). OAuth is an open-standard authorization protocol/framework that provides applications the ability for "secure designated access." In other words, it allows for limited access before the server 330 has been fully authenticated. In this manner, the server 330 can be contacted and the client credentials validated 306 before full authentication 307.

After the client credentials have been validated 306, then the server 330 transmits a request 308 to the ClientCallbackSystem 320 requesting authentication code verification. In an embodiment, the request 308 is sent to a location and using a communication method defined by stored callback communication information that was provided by the client during an earlier registration or other similar procedure. In an embodiment, the request 308 includes the authentication code obtained by the server 330.

The ClientCallbackSystem 320 receives the request and extracts the authentication code therefrom. The ClientCallbackSystem 320 then executes a verification process 312 to verify that the authentication code included in the request message is valid. As discussed above, in embodiments, the ClientCallbackSystem 320 stores and maintains a database of all valid authentication codes (e.g., codes that have been issued and have not expired). The verification process 312 includes comparing the received code to the database in order to ensure that the authentication code is valid. In an embodiment, when the code is initially generated and stored in step 302, the code is stored along with an indicator of the user to which the code has been provided. Thus, as an even further check, in some embodiments, the verification process 312 also examines user identification information included in the request message in order to verify that the authentication code is not only valid but is also associated with a login request by the proper user.

If the validation process 312 fails to identify a valid code that matches the code included in the request message, then the ClientCallbackSystem 320 transmits a FAILURE message back to the server 330 indicating that the authentication code could not be verified. However, FIG. 3 assumes a successful login attempt. Thus, as shown in FIG. 3, if the ClientCallbackSystem 320 validates the code, then the ClientCallbackSystem 320 transmits a SUCCESS message 314 to the server 330 in order to notify the server that the code was successfully validated.

After receiving the reply message from the Client CallbackSystem 320, the server 330 makes a final determination regarding whether to grant the user access to the service 185. In embodiments, if the reply message is a FAILURE message, then the server 330 denies access and terminates the login attempt. However, as shown in FIG. 3, if the reply message is a SUCCESS message, then the server 330 grants the user access to the service 185 in step 316.

Although the above embodiments have been described with respect to a user associated with a larger client, the embodiments are scalable to a personal level as well. For example, in an embodiment, the client and callback server can be replaced with an app running on the user device 110. The app is associated with the authentication server (e.g, a banking app associated with the banking website), and performs substantially the same functions as the client 105 and callback server 120. Specifically, the app detects the login attempt by the user and generates the authentication code, which it stores in its memory. Upon valid credentials being provided by the user, the authentication server 170 pings the app based on app identification information stored in association with the registered user credentials. The app verifies the code included in the ping, and replies with whether the code is valid.

In another embodiment, machine learning algorithms are also employed at the authentication server in order to further enhance verification processes. For example, machine learning can be employed to analyze and store normal behaviors associated with particular users and/or clients. Thus, when a login attempt is performed that deviates from these normal behaviors, the login attempt can be further scrutinized. Such behaviors may include, but are not limited to, means of accessing the authentication server (e.g., through an API, from a particular IP address, etc.), date and time, volume of requests, failure rate, etc. If any of these, or any other monitored aspect of the login deviates from the learned norms, then the login attempt is further scrutinized and/or denied.

Figure 4:
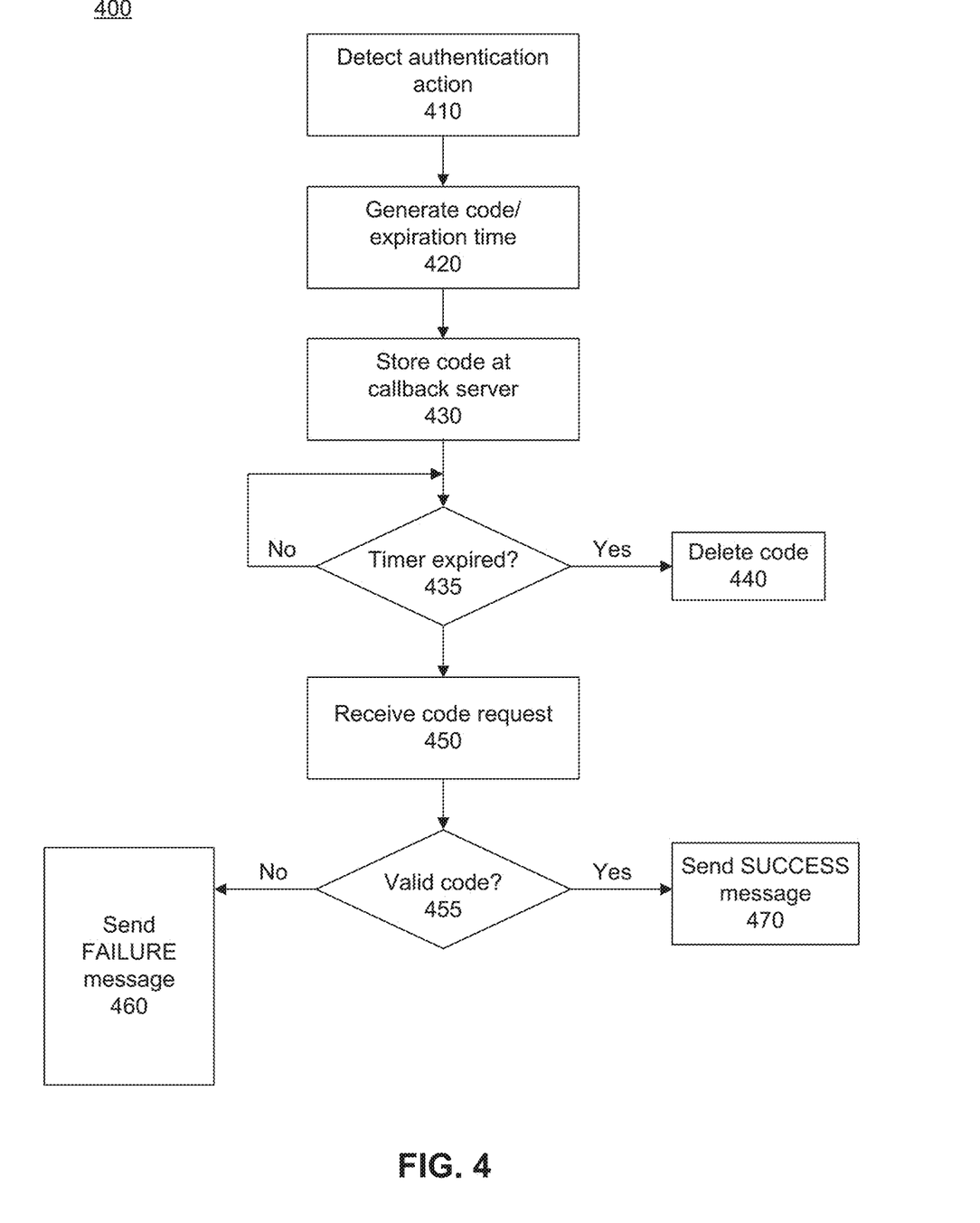
FIG. 4 illustrates a flowchart diagram of an exemplary authentication method according to various embodiments.

FIG. 4 illustrates a flowchart diagram of an exemplary authentication method 400 according to various embodiments.

The method 400 begins by the client detecting an authentication action by a user in step 410. In embodiments, this can be performed by the client being manually notified by the user. In another embodiment, the client automatically makes this detection based on certain actions of the user, such as the user navigating to a URL associated with the service 185.

In step 420, the client generates an authentication code associated with the user's login attempt. In an embodiment, the authentication is a numerical value, represented by a number of bits, such as a 16-bit, 32-bit, or higher numeral. In an embodiment, the client also encrypts the authentication code, which requires decryption during a future validation phase. In an embodiment, the authentication code is also associated with an expiration time, which may be a present duration of time from when the code was created.

In step 430, the client stores the authentication code at a callback server. In an embodiment, the authentication code is stored in association with the expiration time. Prior to the expiration of the expiration time, the authentication code is considered valid. In an embodiment, the authentication code is also stored in an encrypted format.

In step 435, a check is made as to whether the authentication code has expired. In an embodiment, this is performed by comparing the expiration time associated with the authentication code to a current time. In an embodiment, this check recurs for as long as the code is still valid. If the current time is after the expiration time (435-Yes), then the code is invalid and is deleted in step 440. On the other hand, if the current time is before the expiration time, then the code is valid. In this event (435-Yes), the authentication code is maintained in the database.

In an alternative configuration, all codes may be maintained indefinitely together with their expiration time. Additionally, rather than repeatedly checking the validity of the authentication codes, the codes are merely stored together with their expiration time, which is checked upon request. In this manner, computing power is reduced at the cost of storage capacity. In a further embodiment still, the codes are maintained regardless of expiration time, but are deleted upon a periodic sweep of the database (e.g., which may occur once a week, once a month, etc.) At the time of the sweep, all codes that expired beyond a certain period of time from the time of the sweep are deleted while all others are maintained until a future sweep.

At step 450, the callback server 450 receives a code validation request 450. In an embodiment, the code validation request includes an authentication code. In another embodiment, the code validation request further includes user credentials or a user identifier.

In response, the callback server determines in step 455 whether a valid code matching the code included in the code validation request is available. In an embodiment where codes are deleted as they expire, this check is performed by determining whether a code exists in the database that matches the received code. In an embodiment where codes are maintained for a period of time after expiration, this check includes both determining whether a code exists in the database that matches the received code and determining whether a matching code is valid (e.g., not expired). Further, in some embodiments, the authentication codes may be stored with a user identifier of the user to which the authentication code was provided. In this embodiment, the check also includes obtaining user identification information from the received request and verifying that the received user identification information matches the user identification information associated with the stored code.

If no valid authentication code exists (455-N), then a FAILURE message is prepared and sent to the authentication server in step 460. In an embodiment, the FAILURE message includes the authentication code.

Alternatively, if there is a valid code available (455-Yes), then a SUCCESS message is transmitted to the authentication server at step 470. In an embodiment, the SUCCESS message includes the authentication code.

Figure 5:
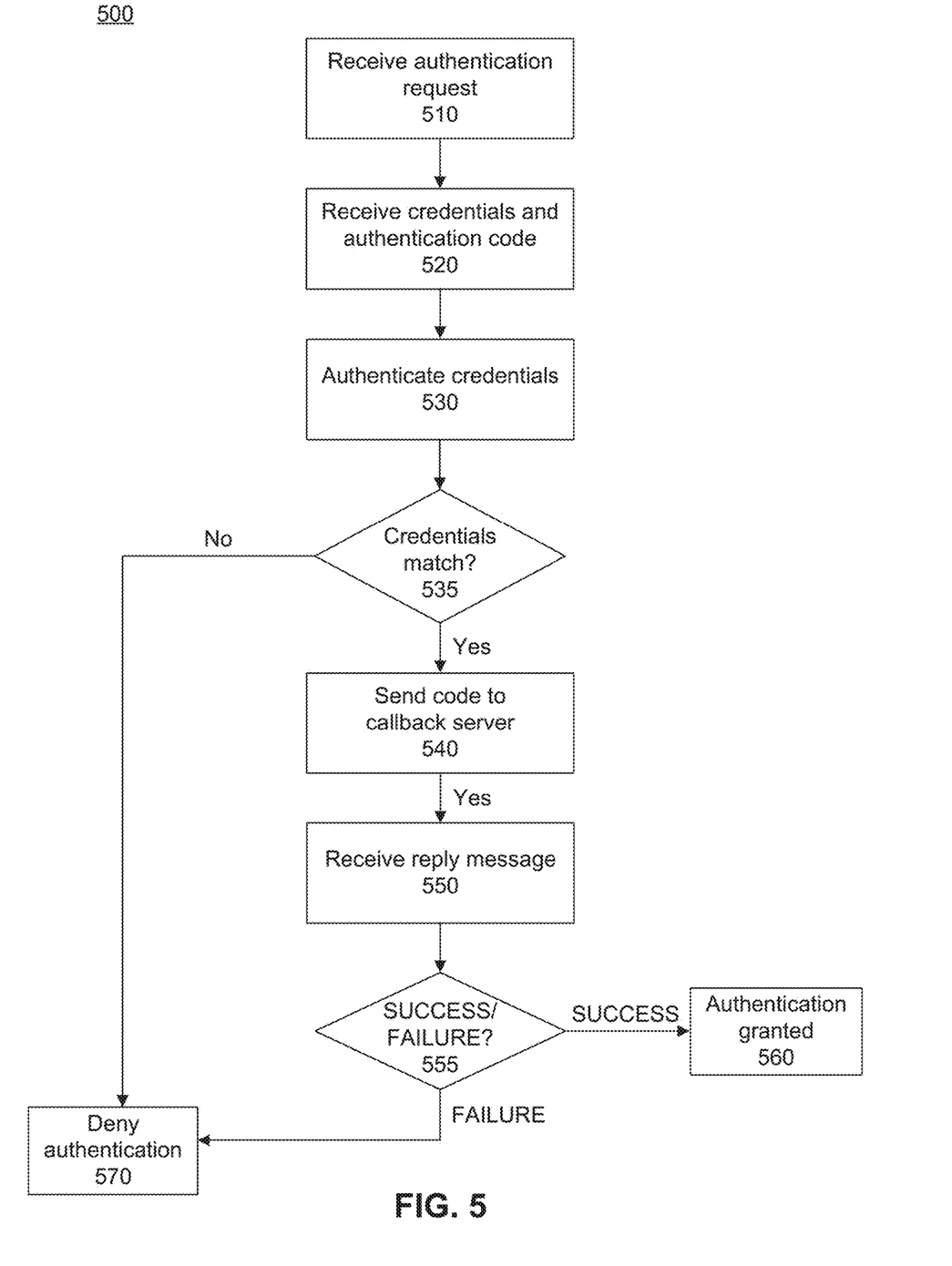
FIG. 5 illustrates a flowchart diagram of an exemplary authentication method according to embodiments.

FIG. 5 illustrates a flowchart diagram of an exemplary authentication method 500 according to embodiments. As shown in FIG. 5, the authentication server receives an authentication request in step 510 from a user. The authentication request includes login credentials of the user, including but not limited to login ID, user ID, username, email address, password, biometrics, answer to secret question, token, etc. In an embodiment, the authentication request is entered within a form field of an HTML page managed by the authentication server or a front-end server associated therewith.

In step 520, the authentication server obtains the user's login credentials from the login request, and also obtains an authentication code associated with the login request. In an embodiment, the authentication code is manually entered by the user at login. However, in another embodiment, the authentication server automatically retrieves the authentication code without user involvement, such as from an HTTP header.

In step 530, the authentication server authenticates the user's credentials. In an embodiment, this step includes comparing the received user credentials to user credentials previously registered with the user. In other words, during a registration process a user is registered and the user's login credentials are stored in memory. In this embodiment, the authentication server identifies the purported user based on the received login credentials and then compares the received login credentials to those associated with the user.

In step 535, the authentication server determines whether the user's credentials match the stored credentials. If they do not match, then the authentication server denies the user access to the service in step 570. Alternatively, if there is a match of the received credentials to registered credentials (535-Yes), then the authentication server sends the received authentication code to the callback server in step 540. In an embodiment, the code is transmitted to the callback server in a request message as dictated by callback communication information stored at the authentication server.

In response to the request message, the authentication server receives a reply message from the callback server in step 550. The reply message indicates whether the code validation was a SUCCESS or FAILURE. In an embodiment, the reply message includes the authentication code.

In step 555, the authentication server determines whether the authentication code was validated. If the reply message indicates that the authentication code was successfully validated (555-SUCCESS), then the authentication server grants the user's access in step 560. Alternatively, if the reply message indicates that the authentication code was not validated (555-FAILURE), then the authentication server denies the user access to the service.

The descriptions of the methods above are merely exemplary. In any of the methods disclosed herein, the order of many of the different steps can be rearranged within the scope of this disclosure. Additionally, each of the methods may include fewer or more aspects depending on the specific embodiments being implemented, in accordance with the above disclosure.

Figure 6:
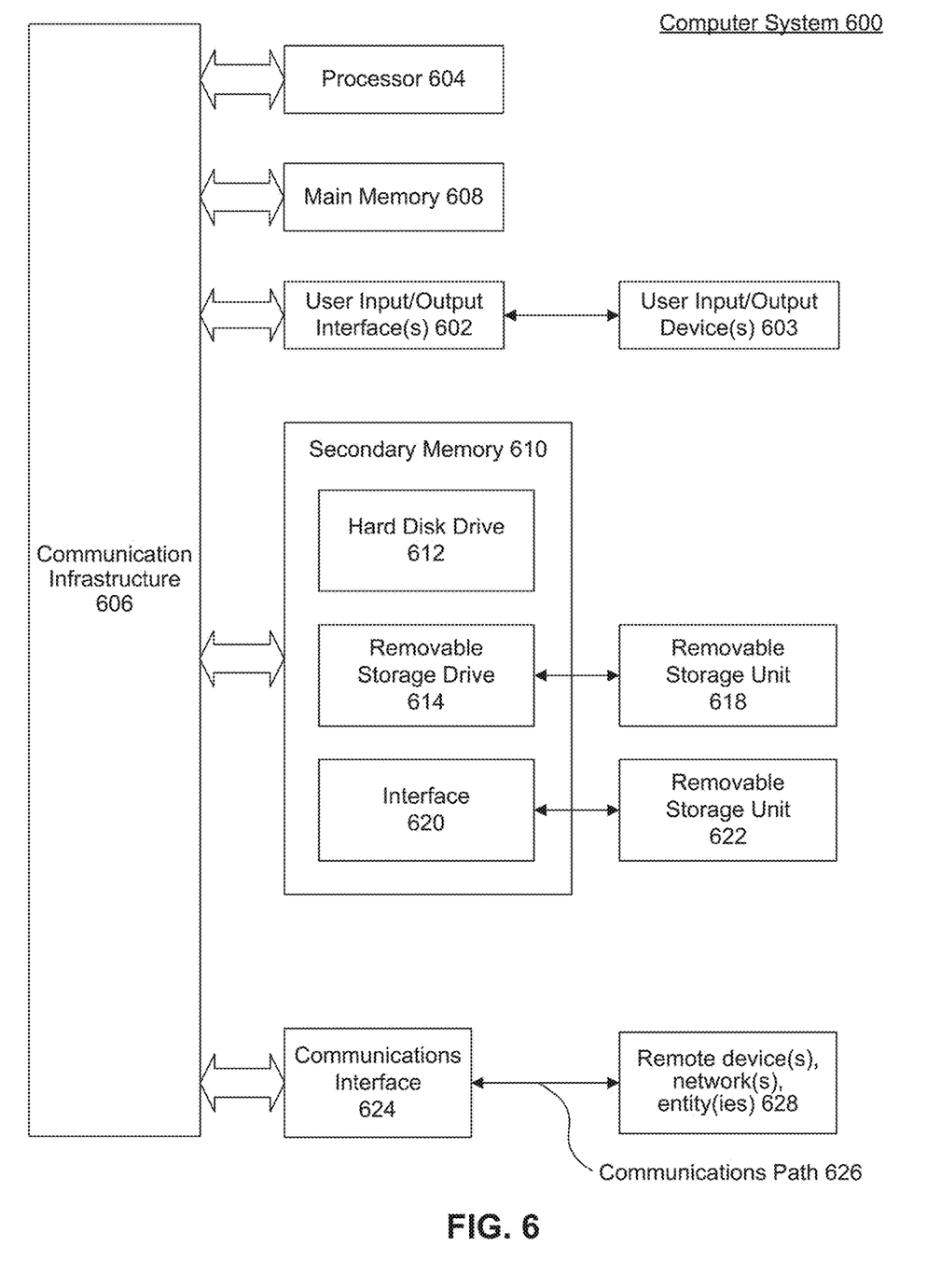
FIG. 6 illustrates an example computer system for implementing some aspects of the disclosure or portion(s) thereof.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors, such as processor 604, may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer usable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. An authentication server, comprising:
a transceiver configured to send and receive electronic messages;
a memory that stores user authentication credentials; and
one or more processors configured to:
receive a first authentication request from a user device, the first authentication request including authentication credentials of a user and an authentication code added to the first authentication request by the user device;
compare the received authentication credentials to the stored user authentication credentials to determine whether there is a match;
identify a client with which the user is associated based on the received first authentication request;
determine a communication address of a callback server associated with the client based on the identified client;
generate a request message that includes the authentication code;
cause the transceiver to transmit a second authentication request to the callback server using the communication address, the second authentication request including the request message;
receive a reply message from the callback server in response to the second authentication request, the reply message being one of a SUCCESS message that indicates that the authentication code matched a code stored at the authentication server or a FAILURE message that indicates that the authentication code did not match a code stored at the authentication server; and
authorize or deny access to the user based on the received reply message.

2. The authentication server of claim 1, wherein the received authentication credentials include a login identification and a password.

3. The authentication server of claim 2, wherein the received authentication credentials further include a client identifier.

4. The authentication server of claim 1, wherein the one or more processors are further configured to extract the authentication code from a Hypertext Transfer Protocol (HTTP) header associated with the first authentication request.

5. The authentication server of claim 1, wherein the one or more processors are further configured to:
receive, via the transceiver, a registration request to register the client with the authentication server, the registration request including a client identifier; and
store the received client identifier in the memory.

6. The authentication server of claim 5, wherein the registration request further includes the communication address for the callback server, and
wherein the one or more processors are further configured to store the communication address in the memory.

7. The authentication server of claim 6, wherein the one or more processors are further configured to:
identify the client identifier based on the first authentication request;
retrieve the communication address of the callback server based on the client identifier; and
cause the transceiver to transmit the request message to the communication address.

8. A method for authenticating a user, comprising:
receiving a first authentication request from a user device associated with the user, the first authentication request including authentication credentials of the user and an authentication code added to the first authentication request by the user device;
comparing the received authentication credentials to stored user authentication credentials to determine whether there is a match;
identifying a client with which the user is associated based on the received first authentication request;
determining a communication address of a callback server associated with the client based on the identified client;
generating a request message that includes the authentication code;
transmitting a second authentication request to the callback server using the communication address, the second authentication request including the request message;
receiving a reply message from the callback server in response to the second authentication request, the reply message being one of a SUCCESS message that indicates that the authentication code matched a code stored at an authentication server or a FAILURE message that indicates that the authentication code did not match a code stored at the authentication server; and
authorizing or denying access to the user based on the received reply message.

9. The method of claim 8, wherein the received authentication credentials include a login identification and a password.

10. The method of claim 9, wherein the received authentication credentials further include a client identifier.

11. The method of claim 8, further comprising extracting the authentication code from a Hypertext Transfer Protocol (HTTP) header associated with the first authentication request.

12. The method of claim 8, further comprising:
receiving a registration request to register the client with the authentication server, the registration request including a client identifier; and
storing the received client identifier in a memory.

13. The method of claim 12, wherein the registration request further includes the communication address for the callback server, and
wherein the request message is transmitted to the communication address.

14. The method of claim 13, further comprising:
identifying the client identifier based on the first authentication request;
retrieving the communication address of the callback server from the memory based on the client identifier; and
transmitting the request message to the communication address in response to the retrieving.

15. A method for providing authentication support to a remote authentication server, the method comprising:

detecting an authentication action by a user at a user device;

generating a first authentication code associated with the authentication action;

transmitting the first authentication code to the user device for providing to the remote authentication server in a first authentication request as part of the authentication action;

storing the first authentication code and a corresponding expiration time in a memory;

receiving a second authentication request from the remote authentication server, the second authentication request including a second authentication code;

comparing the received second authentication code to the first authentication code;

comparing a current time to the expiration time; and transmitting a reply message to the remote authentication server that indicates a SUCCESS of the second authentication request in response to the second authentication code matching the first authentication code and the current time being earlier than the expiration time, or FAILURE of the second authentication request in response to the second authentication code failing to match the first authentication code or the current time being later than the expiration time.

16. The method of claim 15, further comprising:

determining that the expiration time has been passed; and deleting the first authentication code from the memory in response to the determining.

17. The method of claim 15, wherein the comparing determines that the second authentication code does not match the first authentication code, or that the first authentication code has been deleted.

18. The method of claim 15, wherein the reply message further includes a status identifier indicating a reason for at least one of SUCCESS or FAILURE.

* * * * *